(12) United States Patent
Criel et al.

(10) Patent No.: US 8,470,235 B2
(45) Date of Patent: Jun. 25, 2013

(54) PROCESS AND EQUIPMENT FOR MANUFACTURING A FUEL TANK PROVIDED WITH INTERNAL ACCESSORIES

(75) Inventors: Bjorn Criel, Merelbeke (BE); Pierre-Francois Tardy, Brussels (BE)

(73) Assignee: Inergy Automotive Systems Research, Brussels (BE)

( * ) Notice: Subject to any disclaimer, the term of this patent is extended or adjusted under 35 U.S.C. 154(b) by 705 days.

(21) Appl. No.: 12/161,870

(22) PCT Filed: Feb. 2, 2007

(86) PCT No.: PCT/EP2007/051034
§ 371 (c)(1),
(2), (4) Date: Jul. 23, 2008

(87) PCT Pub. No.: WO2007/088200
PCT Pub. Date: Aug. 9, 2007

(65) Prior Publication Data
US 2009/0026664 A1 Jan. 29, 2009

(30) Foreign Application Priority Data

Feb. 3, 2006 (FR) .................................. 06 01017
Apr. 19, 2006 (FR) .................................. 06 03432

(51) Int. Cl.
*B29C 49/20* (2006.01)

(52) U.S. Cl.
USPC ........................................ 264/545; 220/4.12

(58) Field of Classification Search
USPC .. 264/523, 529, 544, 553, 554, 545; 220/563, 220/4.12, 905; 425/522, 531, 535, 357
See application file for complete search history.

(56) References Cited

U.S. PATENT DOCUMENTS

| | | | | |
|---|---|---|---|---|
| 3,308,225 A | * | 3/1967 | Wells | 264/249 |
| 4,178,984 A | * | 12/1979 | Ishikawa | 164/333 |
| 4,662,966 A | * | 5/1987 | Sumi et al. | 156/230 |
| 4,719,072 A | | 1/1988 | Kojima et al. | |
| 4,774,751 A | * | 10/1988 | Pryor | 29/407.04 |
| 4,891,000 A | * | 1/1990 | Ishii | 425/522 |
| 4,952,347 A | | 8/1990 | Kasuga | |

(Continued)

FOREIGN PATENT DOCUMENTS

| | | |
|---|---|---|
| DE | 19600872 A1 | 7/1997 |
| DE | 10010900 A1 | 9/2001 |

(Continued)

OTHER PUBLICATIONS

U.S. Appl. No. 11/658,085, filed Jul. 20, 2005, Criel.

(Continued)

*Primary Examiner* — Richard Crispino
*Assistant Examiner* — Martin Rogers
(74) *Attorney, Agent, or Firm* — Oblon, Spivak, McClelland, Maier & Neustadt, L.L.P.

(57) ABSTRACT

Process for manufacturing a fuel tank provided with internal accessories, based on a plastic parison, which is split or in at least two parts, in which process, the accessories are positioned on the parison while it is being molded, using a core (1) forming part of a mold which also comprises dies (2a, 2b), and in which process, the core is able to move in a controlled manner at a variable speed and/or between optional stop positions of variable duration.

15 Claims, 1 Drawing Sheet

U.S. PATENT DOCUMENTS

| | | | |
|---|---|---|---|
| 5,219,264 A * | 6/1993 | McClure et al. | 414/730 |
| 5,308,427 A * | 5/1994 | Duhaime et al. | 156/245 |
| 5,326,514 A * | 7/1994 | Linden et al. | 264/83 |
| 5,427,732 A | 6/1995 | Shuert | |
| 5,445,783 A * | 8/1995 | Irish et al. | 264/515 |
| 5,536,163 A | 7/1996 | Reil et al. | |
| 6,071,370 A * | 6/2000 | Stiles | 156/285 |
| 6,814,921 B1 | 11/2004 | Van Schaftingen et al. | |
| 6,866,812 B2 | 3/2005 | Van Schaftingen et al. | |
| 6,893,603 B2 | 5/2005 | Rohde et al. | |
| 7,166,253 B2 | 1/2007 | Van Schaftingen et al. | |
| 2001/0009703 A1 | 7/2001 | Toshikawa | |
| 2002/0105115 A1 | 8/2002 | Sadr | |
| 2007/0290414 A1 | 12/2007 | Criel et al. | |

FOREIGN PATENT DOCUMENTS

| | | |
|---|---|---|
| EP | 0755774 A2 | 1/1997 |
| EP | 1110697 A2 | 6/2001 |
| EP | 1184157 A1 | 3/2002 |
| EP | 1910057 A1 | 4/2008 |
| FR | 2420415 A1 | 10/1979 |
| FR | 2521064 A1 | 8/1983 |
| FR | 2879494 A1 | 6/2006 |
| GB | 1410215 | 10/1975 |
| JP | 55105539 A | 8/1980 |
| JP | 56028831 A | 3/1981 |
| JP | 2001-198972 | 7/2001 |
| JP | 2003-291208 | 10/2003 |
| WO | WO0160592 A1 | 8/2001 |
| WO | WO0214050 A2 | 2/2002 |
| WO | WO 2004/007182 * | 1/2004 |
| WO | WO2004007182 A1 | 1/2004 |
| WO | WO2004007183 A1 | 1/2004 |
| WO | WO2006008308 A1 | 1/2006 |
| WO | WO2006045838 A1 | 5/2006 |
| WO | WO2006064004 A1 | 6/2006 |
| WO | WO2006064005 A1 | 6/2006 |
| WO | WO2006064057 A2 | 6/2006 |
| WO | WO2006095024 A1 | 9/2006 |
| WO | WO2007000454 A1 | 1/2007 |
| WO | WO2007093573 A1 | 8/2007 |
| WO | WO2007122154 A1 | 11/2007 |
| WO | WO2008040766 A1 | 4/2008 |

OTHER PUBLICATIONS

U.S. Appl. No. 11/718,161, filed Oct. 27, 2005, Criel.
U.S. Appl. No. 11/721,735, filed Dec. 13, 2005, Mabed.
U.S. Appl. No. 11/721,775, filed Dec. 16, 2005, Criel.
U.S. Appl. No. 11/721,785, filed Dec. 13, 2005, Criel.
U.S. Appl. No. 11/908,336, filed Mar. 10, 2006, Criel.
U.S. Appl. No. 11/993,424, filed Jun. 27, 2006, Criel.
PCT International Search Report dated Jun. 4, 2007 for International Application No. PCT/EP2007/0511034 (3 p.).
Search Report dated Nov. 21, 2006 from Institut National De La Propriete Industrielle for French Application No. FR 06/01017 (2 p.).
Notice of Reasons for Rejection issued May 8, 2012, in Japanese Application No. 2008-552820, drafted Apr. 23, 2012 (with English translation).

* cited by examiner

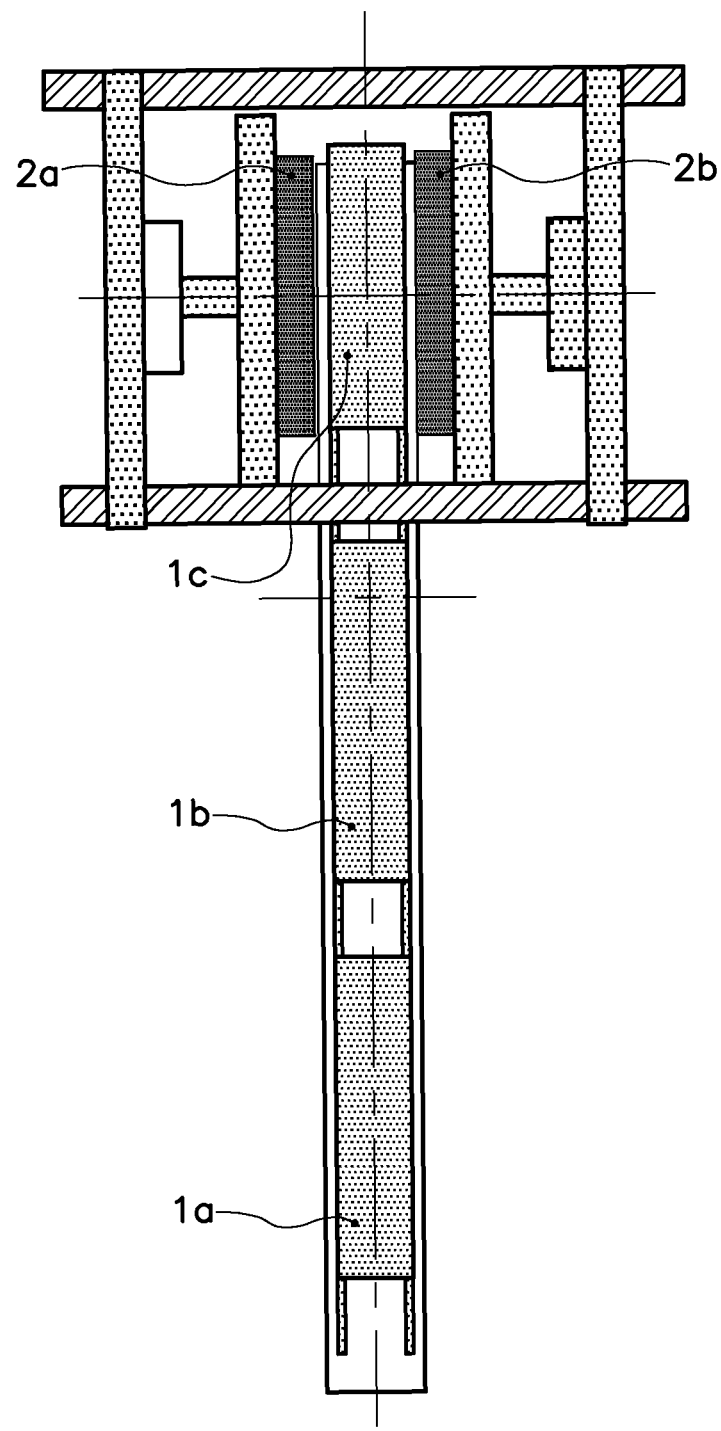

PROCESS AND EQUIPMENT FOR MANUFACTURING A FUEL TANK PROVIDED WITH INTERNAL ACCESSORIES

CROSS-REFERENCE TO RELATED APPLICATIONS

This application is a U.S. national stage application under 35 U.S.C. §371 of International Application No. PCT/EP2007/051034, filed Feb. 2, 2007, which claims priority to French Application No. 0601017, filed Feb. 3, 2006 and further claims priority to French Application No. 0603432, filed Apr. 19, 2006, all of which are hereby incorporated by reference in their entirety for all purposes.

The present invention relates to a process and equipment for manufacturing a fuel tank provided with accessories that are internal (or at least partly internal).

Fuel systems on board vehicles of various types generally comprise devices for the ventilation of hydrocarbons contained in the tank. They may also include devices for supplying the engine with fuel. Such devices form the link between elements contained in the tank (valves, fuel pump, etc.) and elements positioned outside the tank (canister, filling pipe, etc.). The penetration through the wall of the tank must take into account the sealing requirements laid down by current environmental standards (LEV II and PZEV for example). For this purpose, the reduction in the number and size of the openings in the wall of the tank constitutes a favourable factor in reducing evaporative losses. However, this makes it more difficult to insert components into the tank and for positioning them therein.

Current fuel tanks also generally include other functional accessories, such as anti-slosh (and associated anti-noise) baffles, a liquid/vapour separator, one or more gauges for measuring the fuel level, a reserve tank, etc. The object of the latter is to prevent the pump from losing prime should the vehicle run out of fuel or when it is parked for a long time on a slope for example. It is generally provided with a valve (called a "first fill valve") allowing it to be filled when the tank is first filled and/or after running out of fuel, and its size is generally limited to the size of the orifice to be made in the tank in order to be able to introduce it thereinto.

All these internal (more exactly at least partly internal) accessories are generally placed/fastened in the tank after the latter has been moulded, by separate operations that take time and are labour-intensive, and therefore costly.

Application FR 05/08707 in the name of the Applicant relates to a process for manufacturing a fuel tank provided with internal accessories, which allow said accessories to be fastened while the tank is being moulded and which, for this purpose, comprises the following steps:
a) a parison, which is split or in at least two parts, is introduced in the molten state into a mould comprising several dies;
b) the parison is pressed against the mould dies;
c) a core on which the accessories are placed is introduced into the parison;
d) the accessories are fastened to the parison with the aid of the core in an ideal lay-out;
e) the core is removed and the mould is closed;
f) the tank is moulded from the parison; and
g) the tank is removed from the mould.

Now, in such a process, the use of a core may extend the cycle time since it is firstly necessary to load said core with the accessories in question, where appropriate to preheat them, then to introduce the core provided with the components into the mould, in order to fasten them thereto, and, finally, to remove the core in order to be able to close the mould and carry out the final moulding of the tank. Furthermore, since the loading of the accessories on the core generally takes place manually, it is necessary to ensure that the safety provisions are respected and in particular to ensure that the operator is not exposed to excessively high risks of being burnt (by being too close to hot objects) or injured (by being struck by objects moving too rapidly). Finally, since this process involves making at least one weld on the parison (along its slit or its edges, or even also at the point where the components are fastened), this involves at least certain steps being carried out rapidly so as to prevent the parison from solidifying.

Consequently, the object of the invention is to provide a process that is both rapid and reliable, by means of a core whose position and movement can be programmed and, in particular, by means of a particular sequence of positioning and moving the core, devised by the Applicant. This process also makes it possible to obtain good-quality welds (both of the parison and of the accessories, when the latter are fastened by welding the parison).

For this purpose, the present invention relates to a process for manufacturing a fuel tank provided with internal accessories, based on a plastic parison, which is split or is in at least two parts, in which process the accessories are positioned on the parison while it is being moulded, using a core forming part of a mould which also comprises dies, and in which process said core is able to move in a controlled manner at a variable speed and/or with optional stop positions of variable duration.

The term "variable" is understood to mean that the speed can be freely chosen and may or may not be constant from one stop position to another. In general, in a moulding process using a core, there are at least two "obligatory" stop positions for the core (where it necessarily stops): namely that in which the core is in the mould, between the dies, and that in which it is outside the mould. The "optional" positions according to the invention are additional positions, generally intermediate between these obligatory positions. According to the invention, the movement of the core can therefore be controlled so that it has either a variable speed, as explained above, or at least one optional (additional) stop position for a duration that the process can also control, or both these simultaneously. The latter variant, in which the speed and the stop positions of the core are entirely controllable, is preferred.

In a variant of the process according to the invention, the core is able to move between at least two positions in which it is at rest for at least one second, namely:
1. a 1st position outside the dies; and
2. a 2nd position in which it is inserted between the dies, and, during one and the same moulding process, the core is several times in each of these two positions.

In another variant, the core can move between at least three positions in which it is at rest for at least one second, namely:
1. a 1st position which is furthest away from the dies;
2. a 2nd position, intermediate between this 1st position and that of the dies; and
3. a 3rd position in which it is inserted between the dies.

The term "fuel tank" is understood to mean an impermeable tank that can store fuel under various and varied environment and use conditions. An example of this tank is that with which motor vehicles are equipped.

The fuel tank according to the invention is made with a plastic wall, generally comprising an internal face on its concave part and an external face on its convex part.

The term "plastic" is understood to mean any material comprising at least one synthetic resin polymer.

All types of plastics may be suitable. Particularly suitable are plastics that belong to the category of thermoplastics.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are, non-limitingly, random copolymers, linear block copolymers and other block copolymers, and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, polyolefins, thermoplastic polyesters, polyketones, polyamides and their copolymers may be used. A blend of polymers or copolymers may also be used, as well as a blend of polymeric materials with inorganic, organic and/or natural fillers such as, for example, but not limitingly: carbon, salts and other inorganic derivatives, and natural or polymeric fibres. It is also possible to use multilayer structures consisting of stacked layers bonded together, comprising at least one of the polymers or copolymers described above.

One polymer often employed is polyethylene. Excellent results have been obtained with high-density polyethylene (HDPE).

Preferably, the tank to which the process according to the invention is intended has a multilayer structure comprising at least one layer of a thermoplastic and at least one additional layer which, advantageously, may consist of a material that is a barrier to liquids and/or gases.

Preferably, the nature and the thickness of the barrier layer are chosen so as to minimize the permeability of the liquids and gases in contact with the wall of the tank. Preferably, this layer is based on a barrier material, i.e. a fuel-impermeable resin such as, for example, EVOH (a partially hydrolysed ethylene/vinyl acetate copolymer). Alternatively, the tank may be subjected to a surface treatment (fluorination or sulphonation) for the purpose of making it impermeable to fuel.

The process according to the invention uses a core. By this is meant a part of appropriate size and shape for being able to be inserted between the mould dies. Such a part has been described for example in Patent GB 1 410 215, the content of which is introduced for this purpose for reference into the present application. Within the context of the invention, the main function of the core is to position and fasten the accessories to the parison.

According to the invention, any method of fastening the accessories is possible, although welding and pop-riveting (see Application WO 2006/008308 in the name of the Applicant, the content of which is incorporated for this purpose for reference into the present application), are generally more practical. Another technique giving goods results (again outside the scope of the invention, when it is generally required to fasten a component to a parison that is still molten) and which is also similar to pop-riveting, is that consisting in forcing the molten plastic through the orifices of a grid (and then allowing said plastic to cool therein), through cavities in a plate, around teeth, pegs, lugs, etc., that are present on a support—said grid, plate and support being integral with the accessories. In other words, any technique benefiting from the viscoelasticity of molten plastics for following a relief and giving, after cooling, a durable mechanical connection is very suitable, not only within the context of the invention but also for any process involving an accessory being fastened to a molten plastic parison.

When the accessories are fastened by welding, the core may be provided with heating parts (for example heating mirrors) allowing that part of the accessory to be welded to be kept hot (which part is generally preheated, for example by infrared heating, on the core side). The core may also be provided with heating parts (for example heating filaments) in the region or regions that would be in contact with the parison when the accessories are being placed therein.

It should be noted that the preheating of the components within the context of fastening a component by welding does not necessarily have to be carried out on the core. The heating mirrors (or other preheating tools) may for example be positioned on the frame of the machine without forming part of the core. However, the heating mirror (or other preheating tool) should be positioned at the correct moment in the cycle at the right location so as to be able to preheat the component.

The core may also be used to inject a pressurized gas into the mould, so as to press the parison against the mould dies.

Finally, the core may also be used to control the process, at least in part. For this purpose, a camera may for example be incorporated into the core so as to display and check, by image analysis, the quality of the attachment of the accessories. One or more sensors for measuring one or more quantities, such as force, travel, pressure and temperature, may also be installed on the core so as to check the attachment of the accessories more effectively.

In the process according to the invention, the fact that the core is inserted between the mould dies means that the mould dies are closed onto the core, i.e. they are in contact with the latter and define an impermeable region on either side of the core. More precisely, since these dies support the parison, the core is in contact with the parison, which is therefore sandwiched between the core and the mould dies.

In the process according to the invention, the internal accessories are fastened to the parison with the aid of the core, preferably in an ideal lay-out. By this it is meant that at least some of them are in a position such that their performance is optimized. Preferably, this lay-out is such that, overall, the performance of the tank and/or its internal working volume are optimized. To allow the core to adopt such a position, it is advantageous to preposition the accessories at the corresponding location on the die before the dies supporting the parison surround the core supporting the accessories. In other words, they are prepositioned on the core so as to be as close as possible to the corresponding ideal location on the dies when the mould is closed.

It may also be advantageous to provide the core with one or more rams for firmly fastening the component by welding or pop-riveting.

In the process according to the invention, the tank is moulded as a single part (in a single step, after which a one-piece tank is obtained, without recourse to an additional step of assembling separate shells) from a split parison or a parison in at least two parts, and to do so generally by welding the slit or the two parts of the parison when the mould has been closed. In particular, the tank is advantageously moulded by:

blow moulding, i.e. by expanding and pressing a parison, which includes at least one cut-out, against the walls of a mould by means of a pressurized fluid (as described in Application EP 1 110 697, the contents of which have been incorporated for this purpose by reference into the present application)—the term "parison" is understood to mean a preform, which is generally extruded and of any shape, in general substantially plane or tubular, which is intended to form the wall of the tank after moulding, i.e. after an operation consisting in making the parison, which is in the molten state, conform to the required shapes and dimensions using a mould to obtain a one-piece tank; and thermoforming sheets, i.e. by pressing the latter against the walls of a mould, for example by providing suction (creating a vacuum) behind said walls.

Preferably, in the process according to the invention, the tank is moulded by blow moulding. This is because thermoforming generally involves heating the mould to 60° C. so as to be able to achieve deep deformations (corners of the tank for example, where the parison is highly stretched). This results in cycle times that are longer than with blow moulding, in which this constraint does not exist. This is because in general when blow moulding, the mould is at least partly (during certain steps of the process) cooled and/or may be subjected to specific thermal regulation that distinguishes the edges of the dies from the rest of their surface (see Application FR 04/13407 in the name of the Applicant, the contents of which have for this purpose been incorporated for reference into the present application).

In the case of a blow-moulded tank, after or during extrusion of a single tubular parison, the latter is cut over all or part of its length, preferably along two diametrically opposed lines. This cutting may take place in the extrusion die, and this may even have a geometry suitable for converting the cylindrical parison into two sheets. Alternatively, the cutting may take place upon exiting the die and a suitable device (for example comprising clamps and/or rollers) may be used to flatten and smooth the parison parts for making sheets therefrom.

Compared with the blow moulding of two separately extruded sheets, the thickness of which is constant, the use of initially tubular parison portions means that parisons of variable thickness (i.e. not constant over the length), obtained by a suitable extrusion device (generally, an extruder equipped with a die with a mandrel, the position of the mandrel being adjustable), can be used. Such a parison takes account of the reduction in thickness that occurs during blow moulding at some places on the parison, as a result of an irregular degree of deformation of the material in the mould. Preferably, the parison extrusion device lies above the mould dies so that the parison, once it has been cut, can join the mould simply by gravity (preferably with a suitable guiding means, so as to ensure that it enters flat and avoids the formation of pleats).

In the process according to the invention, the core is preferably stationary for at least 1 second when it is in its stop positions. In general, the core performs a to-and-fro motion between these positions. The core stop times vary—they may be not less than 5 seconds, or 10 seconds, or even 20 seconds. They depend in fact on the operation that it is desired to carry out in the stop positions and on the way in which this operation is performed.

The 1st core stop position is generally that in which the core is loaded with the accessories intended to be placed in the mould (before insertion of the parison into the mould) or on the parison. Advantageously, sensors in the core check, during or after this step, the position of each accessory. A position far from the mould dies allows the operator to load the accessories in complete safety (in the case of manual loading) and/or to clear the space needed for the installation and movement of a robot. In general, this position is located at least 1.5 m from the mould, or even at least 2 m.

According to a variant of the invention, a safety door blocks access to the loading position. This door is unlocked when the core returns to the dies and reaches its loading position, so that an operator has free access. Preferably, this door is relocked when the loading has been completed and preferably when the completion of this step has been validated by the operator (for example by pushing a button).

In general, the parts are loaded manually, one by one. Once the part has been positioned at its intended place (preferably a visible point on the core), this part may or may not be secured in its position by clamping it. This clamping may be carried out piece by piece, either manually or automatically (via special detectors). It may also be carried out overall and automatically via special detectors once the loading has been validated by the operator.

In another variant, a frame with the accessories may be manually loaded and then this frame is automatically transferred to and positioned at the core where the accessories are then automatically fitted (for example by a pliers system). Thus, the operator is further away from the moving (and possibly hot) parts and the travel of the core can be reduced—a position of the core very far from the mould dies then no longer being necessary.

A second core stop position, close to the dies, may be used:
  to preheat the accessories and/or check the quality (as already mentioned above, so as to ensure that the accessories are correctly positioned), either using sensors or by image analysis with the aid of a camera, or by any other suitable method. This position is ideally as close as possible to the mould so as to reduce the transfer time and therefore the cooling time of the preheated parts (when the core is moved towards the mould dies) and the cooling time of the edges of the parison (when the core is removed from the mould dies for the final moulding of the tank). In practice, distances of the order of 1 metre or less allow short insertion and extraction times; and
  to place certain accessories in the mould before the parison has been inserted thereinto. One example of such an accessory is a metal ring that will be overmoulded by the parison with a view to obtaining the peripheral zone where the cover of the pump/gauge module will be inserted. In the case of a blow-moulded tank, the region inside this ring (also called an "US-CAR insert" in the jargon of the field) is then preferably that where the pricking by the venting needle takes place (since this is then removed by machining).

For safety reasons, the core is preferably moved slowly from its position away from the dies (where appropriate) to its position close to the dies. However, to prevent, on the one hand, cooling of the accessories between the core position close to the dies and the core position between the dies and, on the other hand, the cooling of the edges of the slit (or of the portions) of the parison between these same positions when the core is removed before the final moulding operation, the movement between these positions preferably takes place more rapidly (typically in a time of the order of seconds rather than tens of seconds).

As in the aforementioned Application FR 05/08707 (the content of which has been incorporated into the present application for reference), the process according to the invention preferably comprises at least the following steps:
1. the core is loaded with the accessories;
2. the core is introduced into the mould dies against which the parison has been pressed beforehand;
3. the accessories are fastened to the parison by means of a core;
4. the core is removed and the mould is closed;
5. the tank is moulded from the parison; and
6. the tank is removed from the mould.

Another advantage of the process according to the invention is that it allows certain steps to be carried out in parallel. More precisely, in the case of a process in which tanks are moulded one after another in the same equipment, by dint of the mobility of the core between the aforementioned positions, the loading of the core (and the preheating of the accessories and/or the quality check, where appropriate) may take place during the final blow moulding and demoulding of the previous tank (steps 5 and 6 of the process described above). To do this, it is sufficient to ensure that the time required for moving the core between its various positions, for loading it and for the preheating and/or quality check, to be shorter than the time required for moulding and demoulding the tank and for pressing a new parison against the mould dies. In other words, in such a process, step 1 of the above process may be carried out simultaneously with steps 5 and 6.

Another advantage of the process according to the invention is that it allows the quality of the welds to be improved (both that of the components, where appropriate, by reducing the cooling after preheating, and that of the slit or edges of the parison, by allowing the core to be rapidly removed before the parison is welded).

In the process according to the invention, the movement between the stop positions is not necessarily a linear movement. In particular, the movement between certain positions may be adapted according to the machine environment.

Preferably, the movement of the core from one position to another is a horizontal translational movement, or rather a sliding movement substantially parallel to the floor (as this is not necessarily linear). Consequently, when certain steps are carried out in parallel, it is preferred for the demoulding of the tank to also take place by a translation in the same direction as the translational movement of the core. In other words, the tank is removed from the mould dies on one side and the core is introduced between the dies via the other side of the mould.

The present invention also relates to equipment for implementing the process as described above. This equipment comprises a mould with dies and a core, said core being able to move in a controlled manner, at a variable speed and/or with optional stop positions of variable duration.

According to the invention, the core can be stopped in certain positions and can be moved between these positions. These positions are referenced with respect to the position of the dies, or more precisely with respect to the central point of the internal volume lying between the dies when they are closed (either one on the other, or on the core).

In general, to move the core, it is mounted on a movable support. The term "movable support" is understood in fact to mean a system (which may be a pneumatic or other system) capable of keeping the core in the aforementioned positions and of moving them between said positions at a given speed (preferably a programmable speed, the residence time of the core in the stop positions preferably also being programmable).

According to this aspect of the invention, the equipment preferably includes a control unit that incorporates a processor, making it possible in particular, in the case of a process with steps carried out in parallel (see above), to manage the synchronism between the movements and stops of the core, and the tank moulding and demoulding sequences.

The present invention is illustrated non-limitingly by FIG. 1, which in fact is a schematic top view of equipment according to one variant of the invention.

This FIGURE shows the core (1) in three stop positions, namely (1a) for loading the components; (1b) for preheating and/or quality check; and (1c) for incorporating the components. In the latter position (1c), the core (1) is in fact inserted between the left-hand die (2a) of the mould and its right-hand die (2b). The direction in which the tanks produced by this equipment are demoulded is indicated by the arrow.

The invention claimed is:

1. A process for manufacturing a fuel tank containing one or more internal accessories, comprising:
   providing a plastic parison inside a mold, said plastic parison being split or in at least two parts,
   pressing, at least partially, said plastic parison onto dies of said mold,
   while said dies support the pressed plastic parison, fastening the one or more internal accessories to the plastic parison with a core located inside the closed mold with said dies surrounding said core during said fastening, said core being provided with at least one ram, said ram being configured to fasten the one or more internal accessories from said core to the plastic parison while said core is located inside said closed mold,
   after said one or more internal accessories are fastened to the plastic parison with said ram, opening said mold and moving said core with said ram outside said mold,
   wherein moving said core inside and outside said mold is performed in a controlled manner with at least one of a variable speed or one or more stop positions of variable duration.

2. The process according to claim 1, in which the internal accessories are positioned onto the parison and fastened to the parison according to an ideal lay-out, and wherein the process further comprises prepositioning the accessories on the core so as to be as close as possible to the corresponding ideal position on the dies when the mold is closed.

3. The process according to claim 1, in which the parison is a blow-molded parison formed by cutting a single extruded tubular parison along two diametrically opposed lines.

4. The process according to claim 1, wherein during the positioning of the internal accessories onto the parison, the core moves between at least two positions in which the core is at rest for at least one second, including
   a first position outside the dies; and
   a second position between the dies,
   and in which process the core is several times in each of these two positions.

5. The process according to claim 4, wherein a frame containing the internal accessories is loaded into the mold, the core is placed in the first position towards which the frame is automatically transferred, and the internal accessories are automatically loaded onto the core by the frame.

6. The process according to claim 1, wherein during positioning of the internal accessories onto the parison, the core moves between at least three positions in which the core is at rest for at least one second, including
   a first position which is furthest away from the dies;
   a second position, intermediate between this first position and that of the dies; and
   a third position in which the core is inserted between the dies.

7. The process according to claim 6, wherein the speed of the core between the first and the second positions is slower than between the second and third positions.

8. The process according to claim 1, comprising the following steps:
   1. loading the core with the internal accessories;
   2. introducing the core between the dies;

3. fastening the accessories to the parison by the ram;
4. removing the core and closing the mold dies;
5. welding the parison to form the tank from the parison; and
6. removing the tank from the mold.

9. The process according to claim 8, wherein step 1 is repeated simultaneously with step 6 when manufacturing two consecutive fuel tanks.

10. The process according to claim 8, wherein, before the parison is pressed against the dies, an insert is placed in the dies, for overmolding by the parison.

11. The process according to claim 8, wherein, between steps 4 and 5, a final check of the positioning and fastening of the components is carried out by a camera carried by the core.

12. The process according to claim 1, wherein at least one of the internal accessories is metal.

13. The process according to claim 1, wherein during said fastening, said mold surrounds the core such that said dies are in contact with the core and define an impermeable region on either side of the core.

14. The process according to claim 13, wherein during said fastening, said core is in contact with the parison, said parison being sandwiched between the core and the dies.

15. The process according to claim 4, wherein a frame with the accessories is loaded manually, the core is placed in the first position towards which the frame is automatically transferred, and the accessories are automatically loaded onto the core by means of the frame.

\* \* \* \* \*